(12) United States Patent
Beals

(10) Patent No.: US 8,844,816 B2
(45) Date of Patent: Sep. 30, 2014

(54) EXPANDED SMART CARD INTERFACE

(75) Inventor: William Michael Beals, Englewood, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 966 days.

(21) Appl. No.: 12/509,224

(22) Filed: Jul. 24, 2009

(65) Prior Publication Data

US 2011/0017825 A1   Jan. 27, 2011

(51) Int. Cl.
  *G06K 7/06* (2006.01)
  *H04N 21/418* (2011.01)
  *H04N 21/41* (2011.01)
  *G06K 7/00* (2006.01)
  *G06K 19/077* (2006.01)
  *H04N 21/4405* (2011.01)
  *H04N 5/775* (2006.01)
  *H04N 21/426* (2011.01)
  *H04N 21/443* (2011.01)
  *H04N 21/436* (2011.01)

(52) U.S. Cl.
  CPC ...... *G06K 19/07743* (2013.01); *H04N 21/4181* (2013.01); *H04N 21/4122* (2013.01); *G06K 7/0021* (2013.01); *H04N 21/44055* (2013.01); *H04N 5/775* (2013.01); *H04N 21/4263* (2013.01); *H04N 21/4432* (2013.01); *H04N 21/43607* (2013.01)
  USPC .......................................... 235/441; 235/492

(58) Field of Classification Search
  USPC ................................................. 235/441, 492
  See application file for complete search history.

(56) References Cited

U.S. PATENT DOCUMENTS

| 5,126,548 | A | * | 6/1992 | Sekiguchi | 235/492 |
| 5,932,866 | A | * | 8/1999 | Terada et al. | 235/487 |
| 5,969,329 | A |  | 10/1999 | Vallat |  |
| 6,641,049 | B2 |  | 11/2003 | Luu |  |
| 6,817,534 | B2 |  | 11/2004 | Gray |  |
| 6,922,780 | B1 | * | 7/2005 | Siegel | 713/189 |
| 2003/0085287 | A1 |  | 5/2003 | Gray |  |
| 2005/0247795 | A1 | * | 11/2005 | Riedl et al. | 235/488 |
| 2007/0138301 | A1 |  | 6/2007 | Cinkler |  |

FOREIGN PATENT DOCUMENTS

| DE | 10132525 A1 | 1/2003 |
| EP | 1429283 A2 | 6/2004 |
| GB | 2345781 A * | 7/2000 |

OTHER PUBLICATIONS

International Search Report and Written Opinion of the International Searching Authority issued by the European Patent Office for International Application No. PCT/US2010/043008 dated Oct. 7, 2010, 15 pages.
"ISO/IEC Chip Card Standards", retrieved from Cyberd internet site located at http://www.cyberd.co.uk/support/technotes/smartcards.htm on Jul. 23, 2009, 6 pages.

* cited by examiner

*Primary Examiner* — Rafferty Kelly
(74) *Attorney, Agent, or Firm* — Ingrassia Fisher & Lorenz, P.C.

(57) ABSTRACT

Described herein is a smart card having a first set of contact pads disposed on a first region of a first surface of the smart card and a second set of contact pads disposed on a second region of the first surface. The first and second set of contact pads are configured to simultaneously electrically engage a socket of a host device and exchange data with the host device. The smart card also includes control circuitry communicatively coupled to the first and second sets of contact pads and operable to control the exchange of data with the host device.

18 Claims, 5 Drawing Sheets

EXPANDED SMART CARD INTERFACE

BACKGROUND

Television receivers, such as satellite decoders, receive encrypted audio/video content from a service provider and process the content for output to an associated presentation device. Typically, some operations associated with decryption of content are performed by a smart card associated with the television receiver. Smart cards manufactured in conformity with the ISO 7816 standard have eight contact pins, which limits the amount of data that can be exchanged with the television receiver. For applications in which the smart card exchanges only keys with the conditional access system, eight contact pins may be sufficient for the data rate exchanged therebetween. However, if the smart card performs decryption of content, e.g., decrypts an audio/video a transport stream, then standard ISO 7816 smart cards are inadequate for the amount of data to be exchanged with the host device.

BRIEF DESCRIPTION OF THE DRAWINGS

The same number represents the same element or same type of element in all drawings.

DETAILED DESCRIPTION

Figure 1:
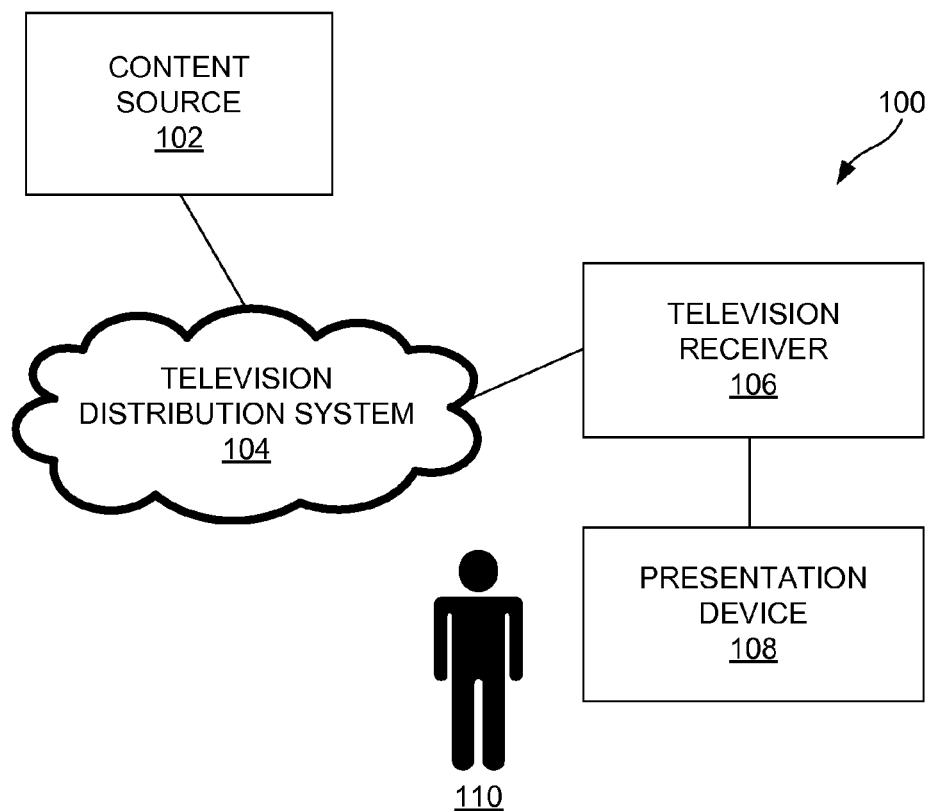
FIG. 1 illustrates an embodiment of a communication network.

The various embodiments described herein generally provide enhanced smart cards. More particularly, described herein are smart cards having 16 pins positioned in two sets of contact pads. By utilizing more pins, the smart cards are able to exchange more data and/or data at a higher rate than standard ISO 7816 smart cards while using the same form factor and interface as the standard ISO 7816 smart cards.

In accordance with at least one embodiment, a smart card has a first set of eight contact pads disposed on a first region of a first surface of the smart card and a second set of eight contact pads disposed on a second region of the first surface. The first and second sets of contact pads are configured to simultaneously electrically engage a socket of a host device and exchange data with the host device. The smart card also includes control circuitry communicatively coupled to the first and second sets of contact pads and operable to control the exchange of data with the host device.

In at least one embodiment, the first set of contact pads are positioned in accordance with the ISO 7816 standard. In other words, the first set of contact pads have the same position and size as standard ISO 7816 smart card contact pads. The second set of contact pads are positioned in accordance with the Association francaise de Normalisation (AFNOR) extensions to the ISO 7816 standard. The AFNOR extensions to the ISO 7816 standard define an alternative position for similar pins utilized in the ISO 7816 standard. A host device that is compliant with the ISO 7816 standard and the AFNOR extensions to the ISO 7816 standard is capable of interfacing with two types of smart cards, having either ISO 7816 compliant contact pads or AFNOR compliant contact pads.

In accordance with at least one embodiment described herein, a smart card includes contact pads positioned and sized in accordance with both the ISO 7816 standard and the AFNOR extensions to the ISO 7816 standard. This allows a smart card to have more than 8 pins and yet still be compliant with the ISO 7816 standard. Thus, the enhanced smart card may be utilized with an enhanced smart card reader of a host device, as described herein, to transfer more data and/or data at a higher rate. However, the same smart card may also be utilized to electrically engage with ISO 7816 compliant devices and transfer data using the ISO 7816 defined pin structure, as appropriate.

In accordance with at least one embodiment described herein, a host device comprises a socket configured to receive a smart card. The host device also includes a first set of pins configured to physically engage a first set of eight contact pads of the smart card and a second set of pins configured to physically engage a second set of eight contact pads of the smart card. The host device also includes control circuitry communicatively coupled with the first and second sets of pins that is operable to control the exchange of data with the smart card via the first and second sets of pins simultaneously.

The enhanced smart card illustrated herein is described in the context of a television receiving system and particularly a satellite television receiving system. However, it is to be appreciated that the enhanced smart card may be utilized in association with any type of host device for any type of purpose. Thus, the enhanced smart card illustrated herein is not restricted to utilization in television decryption devices. Other examples of smart cards which may be enhanced in accordance with the teachings described herein include telephone access cards (e.g., subscriber identity module (SIM) cards), identification cards, financial transaction cards, authentication cards, data storage devices and the like.

FIG. 1 illustrates an embodiment of a communication network 100. The communication network includes a content source 102, a television distribution system 104, a television receiver 106 and a presentation device 108. Each of these components will be discussed in greater detail below. The communication network 100 may include other components, elements or devices not illustrated for the sake of brevity.

The content source 102 is operable for receiving, generating and communicating content to one or more television receivers 106. The content to be received, processed, outputted and/or communicated may come in any of various forms including, but not limited to, audio, video, data, information, or otherwise. In at least one embodiment, the content source 102 is operable for receiving various forms and types of content from other sources, aggregating the content and transmitting the content to the television receiver 106 through the television distribution system 104. It is to be appreciated that the content source 102 may receive practically any form and/or type of information from one or more sources including streaming television programming, recorded audio or video, electronic programming guide data and the like.

The television distribution system 104 is operable to transmit content from the content source 102 to the television receiver 106. The television distribution system 104 may comprise any type of wired (e.g., cable and fiber) and/or wireless (e.g., cellular, satellite, microwave, and other types of radio frequency) communication medium and any desired network topology (or topologies when multiple mediums are utilized). Exemplary television distribution systems 104 include terrestrial, cable, satellite and internet protocol television (IPTV) distribution systems. In at least one embodiment, the television distribution system 104 broadcasts or multicasts content to a plurality of television receivers 106. The television distribution system 104 may also distribute content to a specific addressable television receiver 106, such as video-on-demand and the like. In at least one embodiment, the content source 102 may be embodied as a transmission facility of the television distribution system 104. Exemplary content sources 102 include over-the-air (OTA) terrestrial transmission facilities, cable television distribution head-ends, satellite television uplink centers, broadband or internet servers and the like.

The television receiver 106 is operable to receive content from the television distribution system 104 and output the received content for presentation by the presentation device 108. In at least one embodiment, the presentation device 108 is a display device (e.g., a television) configured to display content to a user 110. The television receiver 106 may receive an audio/video stream in any format (e.g., analog or digital format) and output the audio/video stream for presentation by the presentation device 108. In at least one embodiment, the television receiver 106 is a set-top box (e.g., a satellite television receiver, cable television receiver, terrestrial television receiver, internet protocol television (IPTV) receiver or any other type of receiver/converter box) or other similar device that processes and provides one or more audio and/or video output streams to the presentation device 108 for presentation to the user 110. The television receiver 106 may also receive content from other sources besides the television distribution system 104. For example, a satellite television receiver may receive content from a satellite distribution system and may also receive content from the internet.

The presentation device 108 may comprise any type of device capable of receiving and outputting a video signal in any format. Exemplary embodiments of the presentation device 108 include a television, a computer monitor, a liquid crystal display (LCD) screen, a touch screen and a projector. The presentation device 108 and the television receiver 106 may be communicatively coupled through any type of wired or wireless interface. For example, the presentation device 108 may be communicatively coupled to the television receiver 106 through a coaxial cable, component or composite video cables, an HDMI cable, a VGA or SVGA cable, a Bluetooth or WiFi wireless connection or the like. In some embodiments, the television receiver 106 and the presentation device 108 may be integrated as a device combining the functionality of a display device and a television receiver.

Figure 2:
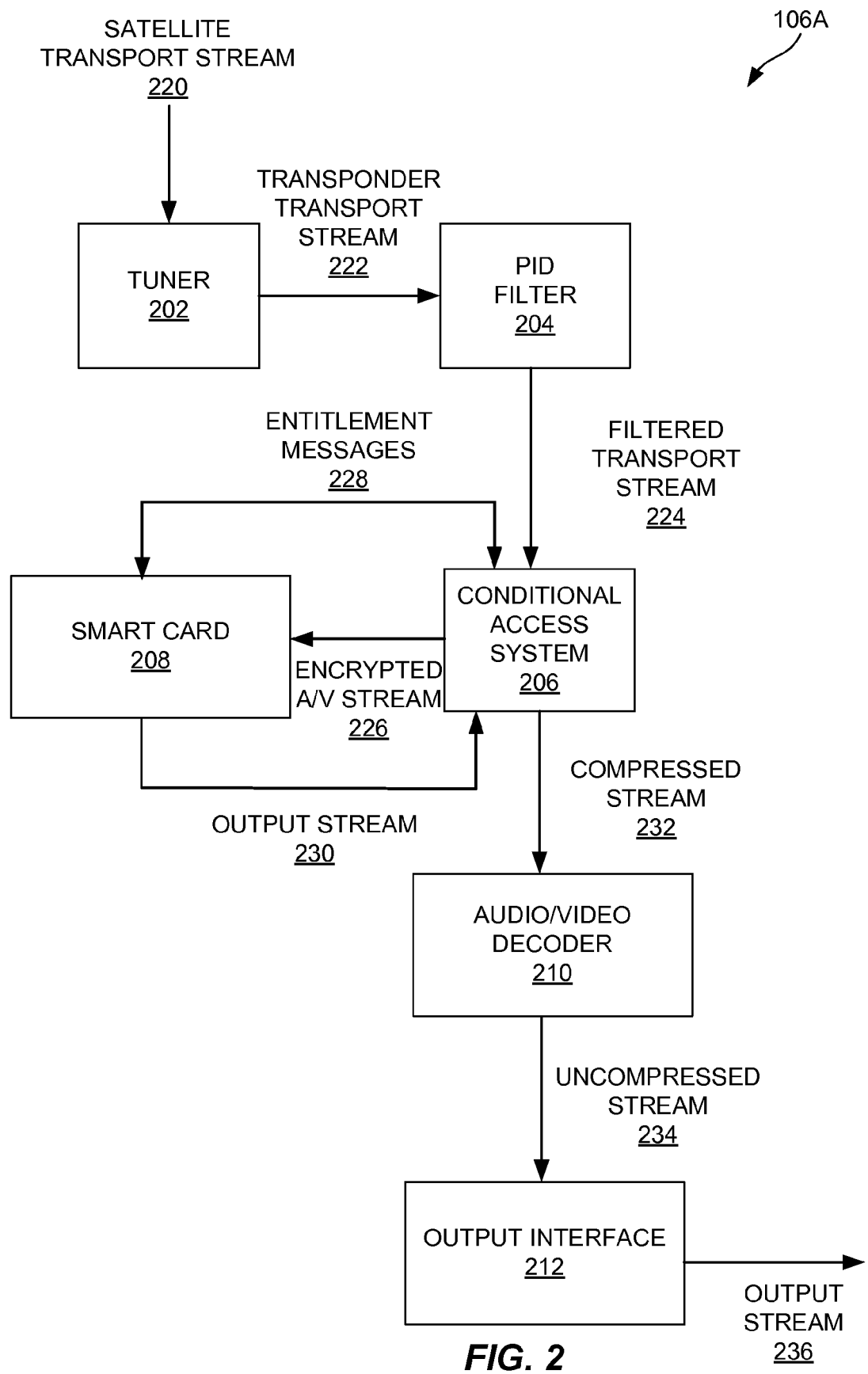
FIG. 2 illustrates a block diagram of an embodiment of a television receiver of FIG. 1.

FIG. 2 illustrates a block diagram of an embodiment of a television receiver of FIG. 1. FIG. 2 will be discussed in reference to the communication network 100 illustrated in FIG. 1. The television receiver 106A will be described in the context of a satellite television receiver. However, it is to be appreciated that the techniques described herein may be applied to other types of television receivers or even other types of data receiving equipment (e.g., satellite radio receivers or data receiving, processing and display devices). The television receiver 106A includes a tuner 202, a PID filter 204, a conditional access system 206, a smart card 208, an audio/video decoder 210 and an output interface 212. Each of these components is discussed in greater detail below. The television receiver 106A may include other components, elements or devices not illustrated for the sake of brevity.

The tuner 202 is operable to receive a satellite transport stream 220 from the content source 102 (see FIG. 1). More particularly, the satellite transport stream 220 includes data associated with multiple transponders of the television distribution system 104. The user 110 provides input to the television receiver 106A requesting to view a particular television channel. For example, the user 110 may select a channel for viewing using a remote control (not shown in FIG. 1) associated with the television receiver 106A. The tuner 202 is operable to identify a transponder carrying the selected channel and extract data associated with the particular transponder to generate a transponder transport stream 222. In at least one embodiment, the television receiver 106A may comprise multiple tuners utilized to tune multiple television programs carried on multiple transponders of the television distribution system 104 simultaneously.

The transponder transport stream 222 may include programming associated with a plurality of channels of a television provider as well as other data, such as electronic programming guide data. For example, the transport stream may include programming from a sports channel, a movie channel and a news channel, electronic programming guide data, entitlement control messages (ECMs) and entitlement management messages (EMMs) multiplexed together. In at least one embodiment, the audio/video content in the transponder transport stream 222 is received in a compressed format, e.g., MPEG-2 or MPEG-4 format. Portions of the data in the transponder transport stream 222 may be encrypted while other portions of the transponder transport stream 222 may be unencrypted. The various components within the transponder transport stream 222 may be identified by unique PIDs. For example, video data associated with the sports channel may be associated with a first PID and audio data associated with the sports channel may be associated with a second PID. Similarly, control words utilized to decrypt the content may be associated with a third PID of the transport stream.

In at least one embodiment, the tuner 202 transmits the transponder transport stream 222 to the PID filter 204. The PID filter 204 is operable to extract the PID streams associated with a particular channel selected for viewing by the user 110 to generate the filtered transport stream 224. The PID filter 204 provides a filtered transport stream 224, including selected PIDs, to the conditional access system 206 for decryption of the encrypted audio/video content contained therein. For example the PID filter may extract programming associated with a selected channel (e.g., a movie channel or a sports channel) from the transponder transport stream 222 to generate the filtered transport stream 224. In at least one embodiment, the transponder transport stream 222 includes unencrypted portions and the tuner 202 may also be communicatively coupled to the audio/video decoder 210 to provide the transponder transport stream 222 to the audio/video decoder 210.

The conditional access system 206 is operable to interface with the smart card 208 to decrypt the filtered transport stream 224. The filtered transport stream 224 may include encrypted audio/video content (e.g., audio and video data associated with a particular program) as well as encrypted key information used to decrypt the audio/video stream. In some embodiments, video data may be encrypted while the audio data is unencrypted. Thus, in at least one embodiment, the filtered transport stream 224 includes encrypted video data but not audio data. The encrypted key information may include for example ECMs and EMMs, which are utilized to decrypt the encrypted audio/video stream in the filtered transport stream 224. An EMM is related to the authorization of services by the content provider. Essentially, an EMM authorizes a particular television receiver 106A or a particular group of television receivers 106A, such as a particular geographic region, to access specified services (e.g., particular television programming). The EMM and ECM are utilized to derive control words, which are utilized as input for decryption of selected audio/video content. The EMM and the ECM may be updated as appropriate by the operator of the television distribution system 104 depending on desired design criteria.

The conditional access system 206 is communicatively coupled to the smart card 208. In at least one embodiment, the conditional access system 206 includes a socket for receiving the smart card 208. For example, the socket of the conditional access system 206 may electrically engage pads of the smart card 208 to communicatively couple other circuitry of the conditional access system 206 with the input and output ports of the smart card 208. In at least one embodiment, the socket of the conditional access system 206 includes 16 pins configured to electrically engage the smart card 208A illustrated in FIG. 4.

The conditional access system 206 may provide an encrypted audio/video stream and entitlement messages 228 to the smart card 208 for further processing. The entitlement messages 228 may be bidirectionally communicated between the smart card 208 and the conditional access system 206. The encrypted audio/video stream 226 includes the encrypted audio/video content received by the conditional access system 206 in the filtered transport stream 224. The entitlement messages 228 include EMMs, ECMs and other similar data received by the conditional access system 206 as part of the filtered transport stream 224. In at least one embodiment, the encrypted audio/video stream 226 is encrypted in accordance with a network or broadcast encryption algorithm implemented by the operator of the television distribution system 104. For example, the smart card 208 may utilize and decrypt information within the EMMs and the ECMs to derive a control word, which is a key for descrambling the encrypted audio/video stream 226. The decryption process yields an unencrypted audio/video stream within the smart card 208.

In at least one embodiment, the smart card 208 transfers the unencrypted audio/video output stream 230 to the conditional access system 206 for further processing. For example, the conditional access system 230 may perform additional decryption operations as outlined below. In at least one embodiment, the unencrypted output stream 230 includes compressed audio/video data (e.g., MPEG data). The conditional access system 206 then transfers the compressed stream 232 to the audio/video decoder 210.

In at least one embodiment, the smart card 208 is operable to re-encrypt the unencrypted output stream 230 prior to transmission to the conditional access system 206. For example, the smart card 208 may re-encrypt the unencrypted output stream 230 in accordance with another decryption algorithm utilized by the smart card 208 and the conditional access system 206. The conditional access system 206 then decrypts the audio/video stream and provides the compressed audio/video data to the audio/video decoder 210. In at least one embodiment, the algorithm utilized to encrypt the output stream 230 may be different than the algorithm utilized to encrypt the encrypted audio/video stream 226 received from the content source 102 by the television receiver 106A. For example, the output stream 230 may be encrypted/decrypted using keys embedded within the smart card 208 and the conditional access system 206. In some embodiments, the output stream 230 may be encrypted/decrypted using dynamically changing keys communicated between the smart card 208 and the conditional access system 206 or utilizing keys generated based on output of a pseudo random number generator depending on desired design criteria.

The audio/video decoder 210 is operable to receive the compressed stream 232 and decode the associated content to generate the uncompressed stream 234. In at least one embodiment, the audio/video decoder 210 may comprise multiple components, such as an audio decoder and a video decoder which receive separate inputs and provide separate uncompressed output components, e.g., audio and video components, depending on desired design criteria. The output interface 212 receives the uncompressed stream 234 and converts the audio and video components into an appropriate format for output to the presentation device 108. In at least one embodiment, the output interface 212 is embodied as a modulator that modulates the output stream 236 into one or more audio/video formats. The output interface 212 may incorporate circuitry to output the output stream 236 in any format recognizable by the presentation device 108, including composite video, component video, RF modulation, internet protocol (IP) streaming, SCART, Digital Visual Interface (DVI) and High-Definition Multimedia Interface (HDMI).

Figure 3:
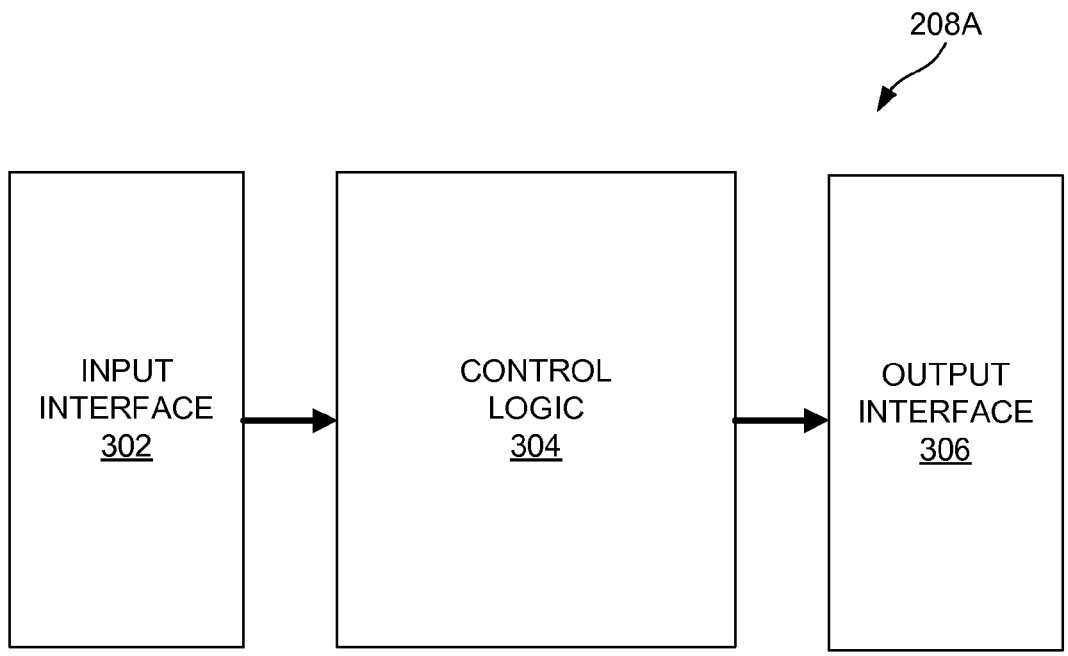
FIG. 3 illustrates an embodiment of a smart card.

FIG. 3 illustrates an embodiment of a smart card implementing the techniques described herein. The smart card 208A includes an input interface 302, control logic 304 and an output interface 306. Each of these components is discussed in greater detail below. The smart card 208A may include other components, elements or devices not illustrated for the sake of brevity.

The input interface 302 is operable to communicatively couple the smart card 208A to components of a television receiver 106A. In at least one embodiment, the input interface 302 includes one or more pins that electrically couple to a smart card socket of a television receiver 106A. For example, the smart card 208A may include two sets of eight contact pads in at least one embodiment and the pins corresponding with the input interface 302 may be distributed across both sets of contact pads. The input interface 302 is operable to receive encrypted audio/video content and other data, such as authorization messages and key information from components of a television receiver 106A, such as the tuner 202, the PID filter 204, the conditional access system 206, multiplexer and/or control logic of the television receiver 106A. In at least one embodiment, the key information received by the input interface 302 is encrypted. In at least one embodiment, the entitlement messages may be communicated between the television receiver 106A and the control logic 304 through an interface separate from the input interface 302. For example, the smart card 208A may include separate input/output pins for communicating entitlement messages with a conditional access system of the television receiver 106A.

Similarly, the output interface 306 is operable to communicatively couple the smart card 208A to components of a television receiver 106A. In at least one embodiment, the output interface 306 includes one or more contact pads that electrically couple to the aforementioned smart card socket of the television receiver 106A. In at least one embodiment, the output interface 306 is communicatively coupled to a local decrypter of the television receiver 106A through the smart card socket.

The input interface 302 and the output interface 306 may comprise the same contact pads or discrete contact pads of the smart card 208A, depending on desired design criteria. For example, one or more contact pads may be designated for both input and output, depending on a current configuration of the smart card 208A. In at least one embodiment, different contact pads may be dedicated to input of data from the conditional access system 206 or output of data to the conditional access system 206, depending on desired design criteria. The configuration of the pins of the input interface 302 and the output interface 306 will be described in greater detail below.

The control logic 304 is operable to control the operation of the smart card 208A. The control logic 304 may be a single processing device or a plurality of processing devices that cooperatively operate to control the operation of the smart card 208A. The control logic 304 may include various components or modules for decrypting audio/video content encrypted using a network encryption process. In at least one embodiment, the control logic 304 includes a crypto processor for decrypting encrypted audio/video streams received by the input interface 302. In at least one embodiment, the control logic 304 may be further operable to re-encrypt the decrypted content in accordance with a different algorithm. The output of the control logic 304 is then transmitted via the output interface 306 to the conditional access system 206.

Figure 4:
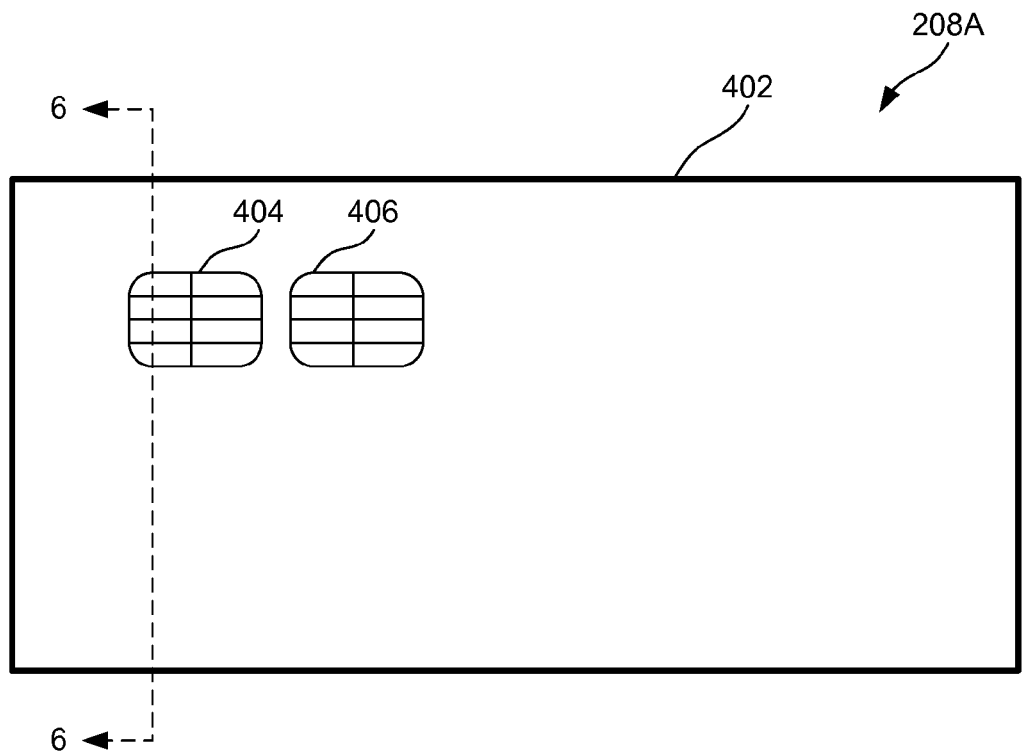
FIG. 4 illustrates an outer view of an embodiment of the smart card of FIG. 3.
Figure 5:
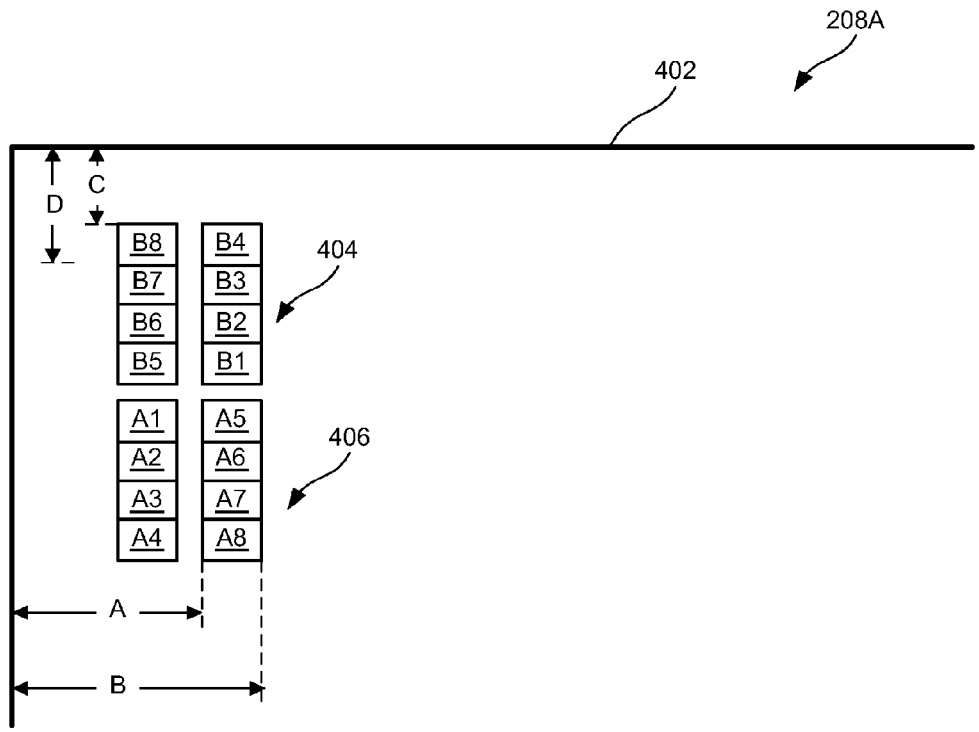
FIG. 5 illustrates exemplary dimensions of an embodiment of the smart card of FIG. 3.
Figure 6:
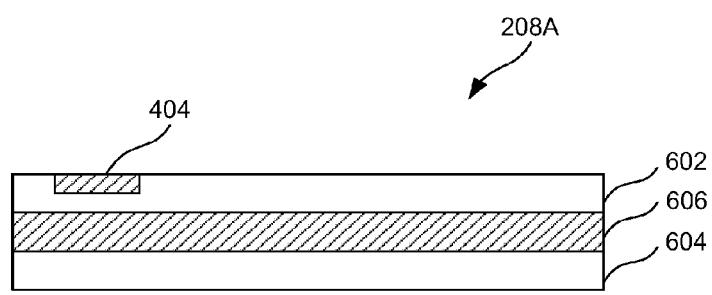
FIG. 6 illustrates a cross-sectional view of the smart card of FIG. 4.

FIG. 4 illustrates an outer view of an embodiment of the smart card 208A. FIG. 5 illustrates exemplary dimensions of an embodiment of the smart card 208A. FIG. 6 illustrates a cross-sectional view of the smart card 208A. The dimensions in the cross-sectional view are for illustrative purposes only and are not to scale. The smart card 208A includes a card body 402, a first set of contact pads 404 and a second set of contact pads 406. Each of these components is discussed in greater detail below.

The card body 402 may be made of any appropriate material, such as plastic and houses the various components of the smart card 208A, such as the control logic 304. In at least one embodiment, the card body 402 is constructed of several layers, including a first layer of plastic 602, a second layer of plastic 604 and a metallic layer 606 disposed between the two layers of plastic 602 and 604. The metallic layer 606 is configured to dissipate heat generated by the operation of the control logic 304. In at least one embodiment, the plastic layers 602 and 604 are formed into a single piece of plastic that fits around the metallic layer 606. The contact pads 404 and 406 are disposed along the first layer of plastic 602.

In at least one embodiment, the dimensions of the card body 402 are 53.97 mm by 85.60 mm, as defined by the ISO 7816-1 standard. The card body 402 may further have a thickness of 0.78 mm in accordance with the same standard. In another embodiment, the card body 402 is configured as a SIM card, which has dimensions of 25 mm by 15 mm.

The smart card 208A includes two sets of contact pads 404 and 406 disposed along a first surface of the smart card body 402. Each set of contact pads may include eight pins in accordance with the ISO 7816 standard. For example, the set of contact pads 404 includes the contact pads labeled A1-A8. The second set of contact pads 406 includes the contact pads labeled B1-B8. In at least one embodiment, the first set of contact pads 404 is positioned and sized in accordance with the ISO 7816 standard. The second set of contact pads 406 may be positioned and sized in accordance with the AFNOR extensions to the ISO 7816 standard.

Table #1 illustrates exemplary locations of the contact pads in accordance with one embodiment of the smart card 208A adhering to locations specified in the ISO 7816 and AFNOR extensions to the ISO 7816 standard. The dimension A specifies the minimum position of the left edge of the contact pad and the dimension B specifies the minimum position of the right edge of the contact pad, as measured from the left edge of the card body 402. The dimension C specifies the minimum position of the top edge of the contact pad and the dimension D specifies the minimum position of the bottom edge of the contact pad, as measured from the top edge of the card body 402. All sizes are specified in millimeters.

TABLE 1

Locations of Contact Pads for Smart Card 402

| Contact Pad | A | B | C | D |
|---|---|---|---|---|
| A1 | 10.25 | 12.25 | 19.23 | 20.93 |
| A2 | 10.25 | 12.25 | 21.77 | 23.47 |
| A3 | 10.25 | 12.25 | 24.31 | 26.01 |
| A4 | 10.25 | 12.25 | 26.85 | 28.55 |
| A5 | 17.87 | 19.87 | 19.23 | 20.93 |
| A6 | 17.87 | 19.87 | 21.77 | 23.47 |
| A7 | 17.87 | 19.87 | 24.31 | 26.01 |
| A8 | 17.87 | 19.87 | 26.85 | 28.55 |
| B1 | 17.87 | 19.87 | 16.69 | 18.39 |
| B2 | 17.87 | 19.87 | 14.15 | 15.85 |
| B3 | 17.87 | 19.87 | 11.61 | 13.31 |
| B4 | 17.87 | 19.87 | 9.07 | 10.77 |
| B5 | 10.25 | 12.25 | 16.69 | 18.39 |
| B6 | 10.25 | 12.25 | 14.15 | 15.85 |
| B7 | 10.25 | 12.25 | 11.61 | 13.31 |
| B8 | 10.25 | 12.25 | 9.07 | 10.77 |

In other words, the left edge of the contact pad A8 should be positioned no more than 10.25 mm from the left edge of the smart card body 402. Likewise, the right edge of the contact pad A8 should be positioned no more than 19.87 mm from the left edge of the smart card body 402. The top edge of the contact pad A8 (as orientated in FIG. 4) more than 26.85 mm from the left edge of the smart card body 402. Likewise, the bottom edge of the contact pad A8 (as orientated in FIG. 4) should be positioned no more than 28.85 mm from the left edge of the smart card body 402. This allows for a contact pad meeting the minimum size requirements of 2 mm (left-to-right in FIG. 4) by 1.7 mm (top-to-bottom in FIG. 4) specified in the ISO 7816 standard.

The assignment of the contact pads A1-A8 and B1-B8 may be determined based on desired design criteria. For example, one or more pins may be assigned to each of VCC, Reset, Clock, VPP and/or Input/Output. In accordance with one embodiment, the Pins B1-B8 are assigned in accordance with the ISO 7816 standard. For example, B1 may be assigned to VCC, B2 may be assigned to reset, B3 may be assigned to clock, B5 may be assigned to ground, B6 may be assigned to VPP (programming voltage) and B7 may be assigned to transferring input/output data. Thus, the contact pads B1-B8 are compatible with ISO 7816 compliant devices.

In at least one embodiment, the pins A1-A8 are assigned to input/output data, depending on desired design criteria. Specific pins A1-A8 may be assigned to bidirectional data transfer or may be dedicated to a particular input/output direction, depending on desired design criteria. For example, one or more pins may be assigned to handle bidirectional command and control data and other pins may be assigned to specific input and output directions. In accordance with one embodiment, pins B4 and B8, which are reserved for future use under the ISO 7816 standard, and/or pin B6, which has been deprecated under the ISO 7816 standard, may be reassigned to input/output data transmission, depending on desired design criteria. Thus, in accordance with one embodiment, the smart card 208A includes 12 input/output pins utilized to exchange data with the television receiver 106A.

In at least one embodiment, the smart card 208A is configured to operate with an enhanced television receiver 106 (e.g., a television receiver with a 16 pin smart card socket) as well as a television receiver having a standard 8 pin ISO 7816 smart card socket. Thus, the control logic 304 may be operable to identify whether the smart card 208A should operate in a first configuration, associated with exchanging data with the television receiver 106A using 8 pins or a second configuration, associated with exchanging data with the television receiver 106A using 16 pins.

Figure 7:
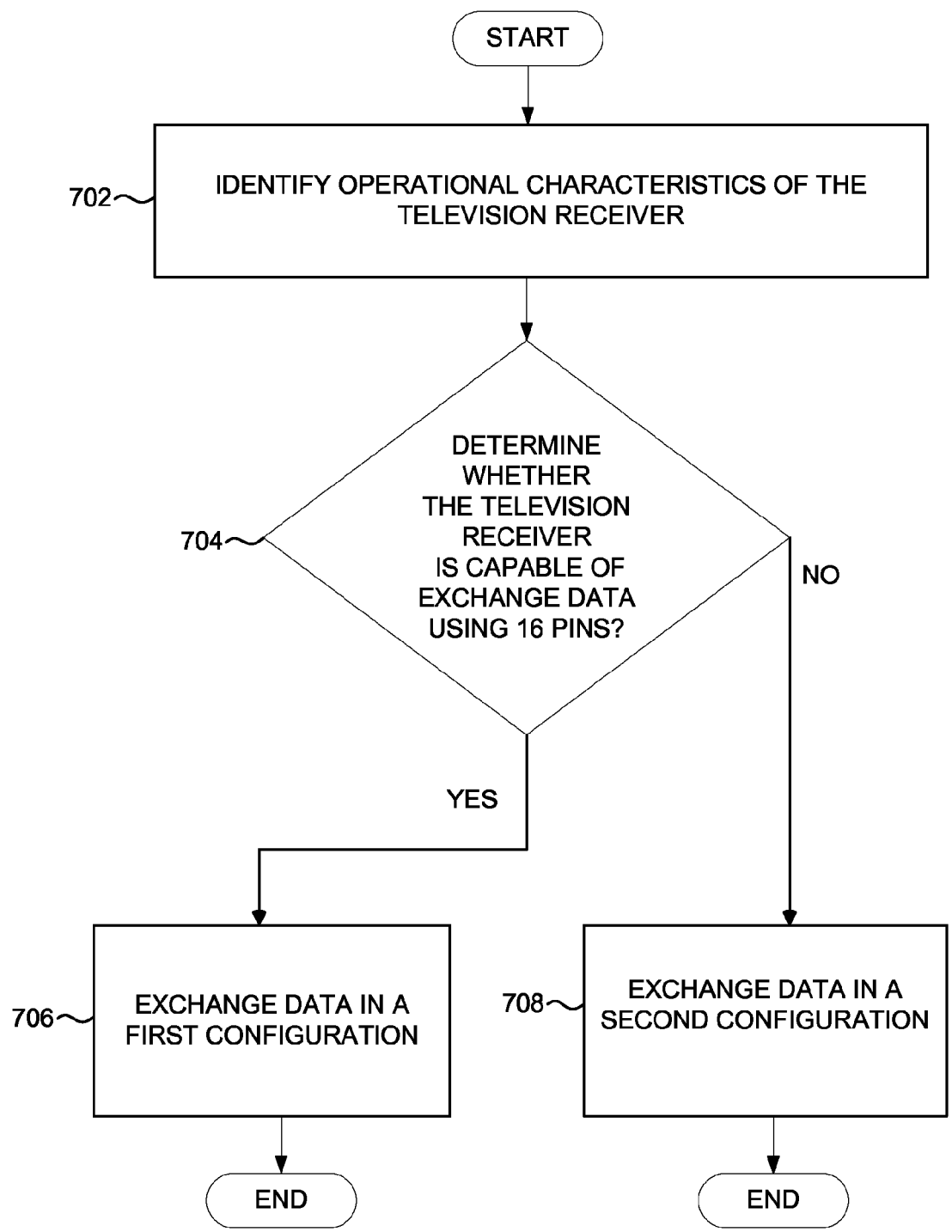
FIG. 7 illustrates an embodiment of a set-up process employed by the smart card of FIGS. 3-6.

FIG. 7 illustrates an embodiment of a set-up process employed by a smart card 208A of FIGS. 3-6. More particularly, the process of FIG. 7 is directed at identifying the data exchange configuration utilized by the smart card 208A. A similar processing may be employed by the television receiver 106A to identify the configuration for utilization in communications with a smart card having either 8 pins or 16 pins. The process of FIG. 7 may include other operations not illustrated for the sake of brevity.

The process includes exchanging data with the television receiver 106A to identify operational characteristics of the television receiver 106A (operation 702). For example, the control logic 304 may negotiate with the television receiver 106A using a single set of contact pads to identify how many pins the television receiver 106A has to communicate with the smart card 208A.

The process further includes determining whether the television receiver 106A is capable of exchanging data using 16 pins (operation 704). If the television receiver 106A is capable of receiving data using 16 pins, then processing continues at operation 706. Otherwise, the smart card 208A identifies that the television receiver 106A has 8 pins and processing continues at operation 708.

In operation 706, the control logic 306 begins exchanging data with the television receiver 106A in a first configuration. In other words, the control logic 306 exchanges data with the television receiver 106A using 16 pins. In at least one embodiment, the first configuration is associated with particular operations performed by the control logic 306. For example, the control logic 306 may receive an audio/video input stream from the television receiver 106A (via the input interface 302), decrypt the stream and initiate transmission of the stream to the television receiver 106A (via the output interface 306).

In operation 708, the control logic 306 begins exchanging data with the television receiver 106A in a second configuration. In other words, the control logic 306 exchanges data with the television receiver 106A using 8 pins. In at least one embodiment, the second configuration is associated with particular operations performed by the control logic 306. For example, the control logic 306 may receive encrypted key information from the television receiver 106A (via the input interface 302), decrypt the key information and initiate transmission of the decrypted key information to the television receiver 106A (via the output interface 306).

Thus, the smart card 208A may operate in multiple modes to interface with different types of television receivers having varying input capabilities. Advantageously, the smart card 208A may interface with an enhanced television receiver 106A, capable of exchanging data using 16 pins and operate to decrypt one or more transport streams within the smart card. However, if the smart card 206A is utilized in association with a television receiver having only 8 input pins, then the smart card 206A may operate to exchange key information rather than decrypting a transport stream. Thus, the smart card 206A may configure itself to the interface capabilities of the host device.

In at least one embodiment, the smart card 206A may determine the data exchange capabilities of the television receiver by identifying whether the first set of contact pads 404 are electrically engaged with the socket of the television receiver. If the first set of contact pads 404 are not electrically engaged with the socket of the television receiver, then the control logic 304 identifies that the television receiver includes eight pins. Thus, the control logic 304 operates in accordance with the ISO 7816 standard to transfer data using the pins B1-B8 of the second set of contact pads 406. Otherwise, the control logic 304 operates in a second configuration to transfer data using all of the pins A1-A8 and B1-B8 to achieve a higher data transfer rate.

In at least one embodiment, the control logic 304 of the smart card 208A is operable to process multiple input/output streams simultaneously. For example, the conditional access system 206 may receive multiple input/output streams from the PID filter 204 and transfer the streams to the smart card 208A for decryption. In at least one embodiment, each transport stream processed by the smart card 208A may be input from the conditional access system 206 on a dedicated pin and output to the conditional access system 206 on a different dedicated pin.

For example, pin A8 may be utilized to input a first transport stream in an encrypted format and pin A4 may be utilized to output the encrypted version of the first transport stream. Similarly, pins A7 and A3 may be paired to input/output a second transport stream and pins A6 and A2 may be paired to input/output a third transport stream. It is to be appreciated that the pins A1-A8 and B1-B8 may be assigned and utilized in any configuration depending on desired design criteria.

Although specific embodiments were described herein, the scope of the invention is not limited to those specific embodiments. The scope of the invention is defined by the following claims and any equivalents therein.

I claim:

1. A smart card comprising:

a card body, sized in conformity with the ISO 7816 standard and having a top edge and a left edge;

a first set of eight contact pads disposed on a first region of a surface of the smart card, the first set of eight contact pads comprising a first contact pad, a second contact pad, a third contact pad, a fourth contact pad, a fifth contact pad, a sixth contact pad, a seventh contact pad, and an eighth contact pad;

a second set of eight contact pads disposed on a second region of the surface, the second set of eight contact pads comprising a ninth contact pad, a tenth contact pad, an eleventh contact pad, a twelfth contact pad, a thirteenth contact pad, a fourteenth contact pad, a fifteenth contact pad, and a sixteenth contact pad, and the first and second set of contact pads configured to simultaneously electrically engage a socket of a host device and exchange data with the host device; and control circuitry communicatively coupled to the first and second sets of contact pads and operable to control the exchange of data with the host device in accordance with multiple modes to interface with input capabilities of the host device;

wherein the control circuitry determines data exchange capabilities of the host device by identifying whether both sets of eight contact pads are electrically engaged with the socket of the host device or whether only one of the sets of eight contact pads is electrically engaged with the socket of the host device;

wherein, when the control circuitry identifies that both sets of eight contact pads are electrically engaged with the socket of the host device, the control circuitry receives an encrypted audio/video stream from the host device, decrypts the encrypted audio/video stream to yield an output audio/video stream within the smart card, and initiates transmission of the output audio/video stream to the host device, using both sets of eight contact pads; and wherein, when the control circuitry identifies that only one of the sets of eight contact pads is electrically engaged with the socket of the host device, the control circuitry receives encrypted key information from the host device, decrypts the encrypted key information to obtain decrypted key information, and initiates transmission of the decrypted key information to the host device.

2. The smart card of claim 1, wherein the first set of contact pads includes a clock pin, a ground pin, a reset pin, a voltage pin and at least one input/output pin and wherein the second set of contact pads includes a plurality of input/output pins.

3. The smart card of claim 2, wherein the first set of contact pads includes four input/output pins.

4. The smart card of claim 2, wherein the second set of contact pads includes eight input/output pins.

5. The smart card of claim 1, wherein:
when the control circuitry identifies that both sets of eight contact pads are electrically engaged with the socket of the host device, the control circuitry decrypts the encrypted audio/video stream into a decrypted audio/video stream that serves as the output audio/video stream.

6. The smart card of claim 1, wherein:
when the control circuitry identifies that both sets of eight contact pads are electrically engaged with the socket of the host device, the control circuitry decrypts the encrypted audio/video stream into a decrypted audio/video stream and re-encrypts the decrypted audio/video stream into a re-encrypted audio/video stream that serves as the output audio/video stream.

7. The smart card of claim 6, wherein the encrypted audio/video stream and the re-encrypted audio/video stream are encrypted in accordance with different encryption algorithms.

8. The smart card of claim 6, wherein the control circuitry determines data exchange capabilities of the host device by exchanging data with the host device using only one of the sets of eight contact pads to obtain a number of pins the host device has to communicate with the smart card.

9. The smart card of claim 1, wherein:
the control circuitry operates the smart card in a first configuration to transfer data at a first data transfer rate using only one of the sets of eight contact pads;
the control circuitry operates the smart card in a second configuration to transfer data at a second data transfer rate using both of the sets of eight contact pads; and
the second data transfer rate is higher than the first data transfer rate.

10. The smart card of claim 1, wherein the decrypted key information enables the host device to decrypt encrypted audio/video streams received from a content source.

11. A smart card comprising:
a card body
a first set of contact pads disposed on a first surface of the card body, the first set of contact pads comprising a first contact pad, a second contact pad, a third contact pad, a fourth contact pad, a fifth contact pad, a sixth contact pad, a seventh contact pad, and an eighth contact pad;
a second set of contact pads disposed on the first surface, the second set of contact pads comprising a ninth contact pad, a tenth contact pad, an eleventh contact pad, a twelfth contact pad, a thirteenth contact pad, a fourteenth contact pad, a fifteenth contact pad, and a sixteenth contact pad, the first and second set of contact pads configured to simultaneously electrically engage a first socket of a first host device and exchange data with the host device; and control circuitry communicatively coupled to the first and second sets of contact pads and operable to control the exchange of data with the host device;
wherein the control circuitry determines whether to exchange data between the smart card and the host device using a high data transfer rate configuration or a low data transfer rate configuration;
wherein, for the high data transfer rate configuration, the control circuitry uses both the first set of contact pads and the second set of contact pads to receive an encrypted audio/video stream from the host device, decrypt the encrypted audio/video stream to yield an output audio/video stream within the smart card, and initiate transmission of the output audio/video stream to the host device; and
wherein, for the low data transfer rate configuration, the control circuitry uses either the first set of contact pads or the second set of contact pads to receive encrypted key information from the host device, decrypt the encrypted key information to obtain decrypted key information, and initiate transmission of the decrypted key information to the host device.

12. The smart card of claim 11, wherein the host device is a television receiver.

13. A method of operating a smart card having an input interface, an output interface, control circuitry, a first set of contact pads, and a second set of contact pads, the method comprising:
exchanging data with a television receiver to identify operational characteristics of the television receiver;
determining whether the television receiver is capable of exchanging data using both the first set of contact pads and the second set of contact pads;
in response to determining that the television receiver is capable of exchanging data using both the first set of contact pads and the second set of contact pads, operating the smart card in a high data transfer rate configuration to:
receive an encrypted audio/video stream from the television receiver;
decrypt the encrypted audio/video stream to yield an output audio/video stream within the smart card; and
initiate transmission of the output audio/video stream to the television receiver; and
in response to determining that the television receiver is capable of exchanging data using only one of the sets of contact pads, operating the smart card in a low data transfer rate configuration to:
receive encrypted key information from the host device;
decrypt the encrypted key information to obtain decrypted key information; and
initiate transmission of the decrypted key information to the host device.

14. The method of claim 13, wherein:
the smart card is operated in the high data transfer rate configuration such that the encrypted audio/video is decrypted into a decrypted audio/video stream that serves as the output audio/video stream.

15. The method of claim 13, wherein:
the smart card is operated in the high data transfer rate configuration such that the encrypted audio/video stream is decrypted into a decrypted audio/video stream; and
the method further comprises re-encrypting the decrypted audio/video stream into a re-encrypted audio/video stream that serves as the output audio/video stream.

16. The method of claim 15, wherein the encrypted audio/video stream and the re-encrypted audio/video stream are encrypted in accordance with different encryption algorithms.

17. The method of claim 13, wherein determining whether the television receiver is capable of exchanging data using both the first set of contact pads and the second set of contact pads comprises:
  exchanging data with the television receiver using only one of the sets of contact pads to obtain a number of pins the television receiver has to communicate with the smart card.

18. The method of claim 13, wherein the decrypted key information enables the television receiver to decrypt encrypted audio/video streams received from a content source.

* * * * *